United States Patent [19]

Rossigno

[11] 3,724,910
[45] Apr. 3, 1973

[54] CAM OPERATED CONTROL
[75] Inventor: Louis P. Rossigno, South Bend, Ind.
[73] Assignee: The Bendix Corporation, South Bend, Ind.
[22] Filed: Sept. 29, 1971
[21] Appl. No.: 184,768

[52] U.S. Cl. .................303/12, 60/54.5 P, 417/402
[51] Int. Cl. ..............................................B60t 13/50
[58] Field of Search ..............60/54.5 P, 60; 303/12; 417/402, 403

[56] References Cited
UNITED STATES PATENTS 3,044,405  7/1962  Bent....................................417/403
3,094,843  6/1963  Martin..................................60/60 X
3,113,806  12/1963  Cripe................................303/12 UX Primary Examiner—Duane A. Reger
Attorney—Leo H. McCormick, Jr. et al.

[57] ABSTRACT

A control for positively regulating the alternate flow of partial vacuum from a source of air at atmospheric pressure to operate a pressure differential pump.

10 Claims, 8 Drawing Figures

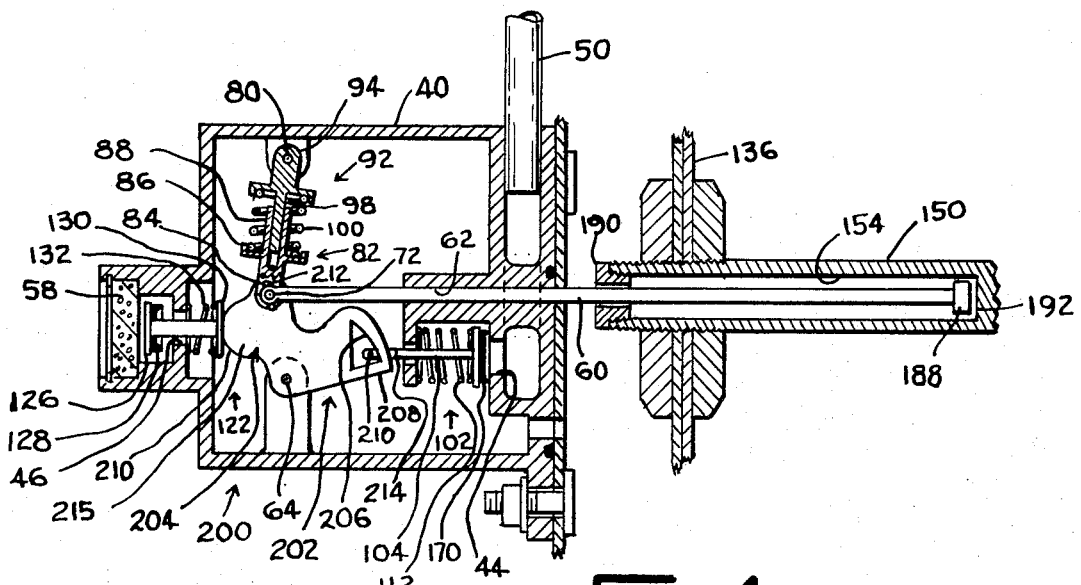

CAM OPERATED CONTROL

BACKGROUND OF THE INVENTION

Spring brakes have been proposed as one part of dual braking systems in anticipation of the Federal Highway's Safety Laws. Initially, each spring brake was operated by an inversion valve connected to the same source of pressurized fluid used to operate the entire braking system. However, if this pressurized fluid were lost, the spring brakes would automatically be applied, as disclosed in U.S. application Ser. No. 797,530, filed Feb. 7, 1969 and incorporated by reference. Later as disclosed in U.S. application Ser. No. 28,843, filed Apr. 15, 1970 and incorporated by reference, a split full power braking system having a pump driven off of the crankshaft was developed to independently supply the inversion valve with a pressurized fluid to operate the spring brakes. Still later as disclosed in U.S. application Ser. No. 91,641 filed Nov. 23, 1970 and U.S. application Ser. No. 126,020 filed Mar. 19, 1971, vacuum powered pumps were developed to conserve and reduce the number of potential devices operated by the power produced by the crankshaft. In these vacuum pumping devices it is necessary to have storage vessels with a flow controlled inlet port to maintain the fluid force required to release the spring brake since these pumps modulated either automatically or manually until a predetermined hydraulic pressure for the system was achieved.

In internal combustion engines, a partial vacuum will normally be produced at the intake manifold. The intensity of this partial vacuum will be the greatest when the accelerator pedal is released, as during periods of braking and while the vehicle is stopped, and the least during periods of continual acceleration or pull up an incline. The intensity of the partial vacuum is directly related to the acceleration pedal whose position controls the intake air into the carburetor while the displacement of air by the pistons remains constant.

In order to converse crankshaft power, vacuum pumps have been developed to operate the spring brakes. Later it was discovered that by maintaining a constant pressure differential across the movable wall in the pump the spring brakes could be maintained in a released position without the necessity of a separate storage unit in the system. However, after a repeated number of cycles of applying the spring brakes it was determined that a positive control means for regulating the alternate supplying of partial vacuum and air at atmospheric pressure was needed to effectively and efficiently operate the pump.

SUMMARY OF THE INVENTION

I have devised a positive control means which is responsive to the directional position of the movable wall means in a pressure differential pump. My control means has a pair of independently operated poppet valve means which are opened by a corresponding cam surface on a lever arm connected to an operational push rod linked to the movable wall means and closed by resilient means on each valve to positively seal the particular inlet supplying the operational fluid needed for a desired directional movement by the wall means.

It is therefore an object of this invention to provide a vacuum operated pump in a power braking system with a positive control for regulating the operational fluid to the pump.

It is another object of this invention to provide a control means for regulating the flow of an operational fluid to a pump to avoid unwanted stalling of a pressure differential operated wall means within the pump.

It is still a further object of this invention to provide lever means with cam surface for independently operating flow valves in series to assure segregated flow of different fluid to a pressure differential operated pump.

These and other objects will become apparent to those who read this specification and view the drawings.

BRIEF DESCRIPTION OF THE DRAWINGS

FIG. 4 is a sectional view of a secondary embodiment of control means for positively regulating the flow of a first operational fluid;

FIG. 5 is a sectional view of the secondary control means of FIG. 4 for regulating the flow of a second operational fluid;

FIG. 6 is a sectional view of a still further embodiment of a control means having a double snap action positioning arrangement for regulating the supply of operational fluid;

FIG. 7 is a sectional view taken along lines 7—7 of FIG. 6; and

FIG. 8 is a prospective view of a blade snap acting spring for use in the embodiment shown in FIG. 6.

DETAILED DESCRIPTION OF THE PREFERRED EMBODIMENT

Figure 1:
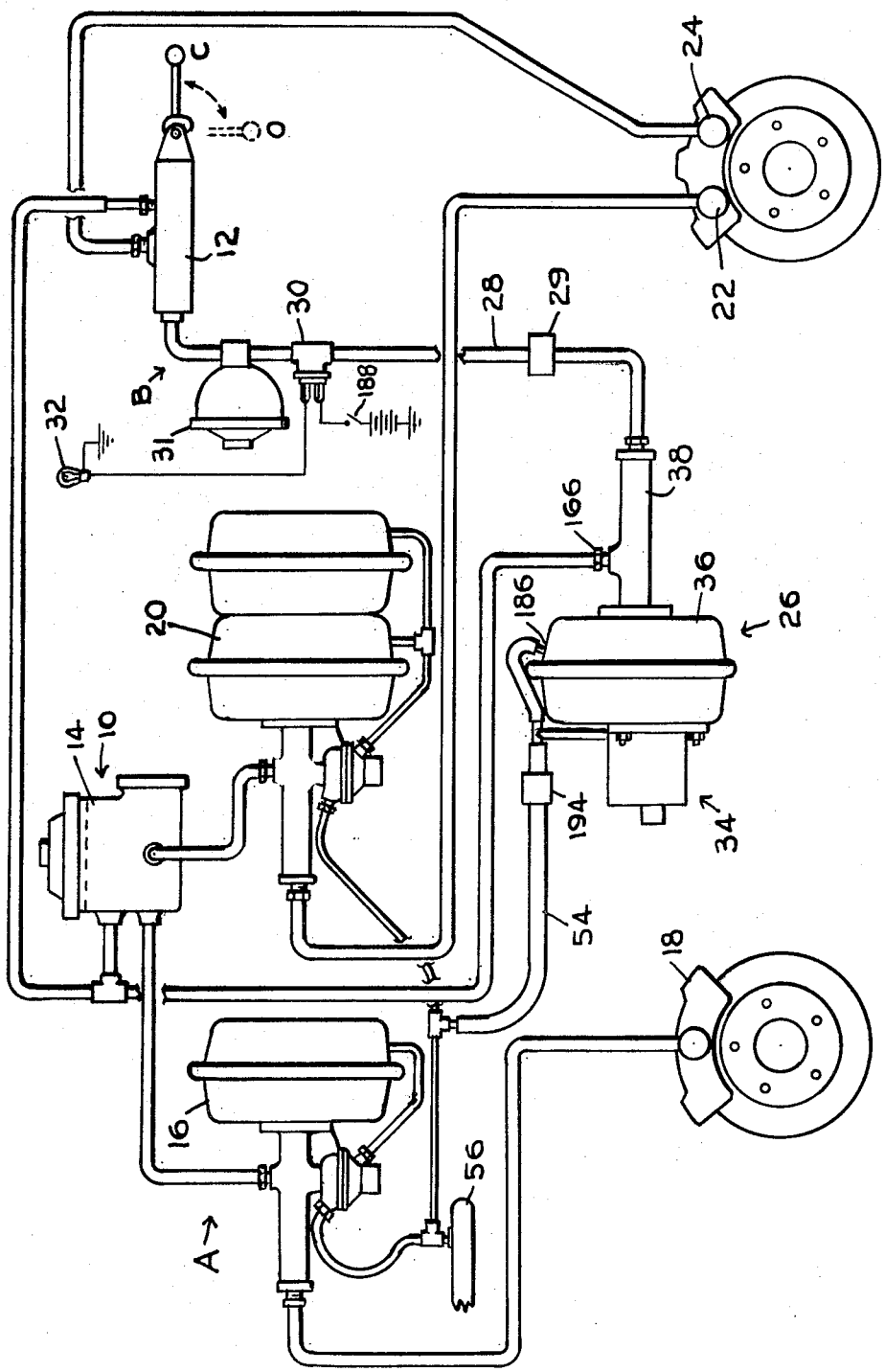
FIG. 1 is a schematic illustration of a dual full power braking system utilizing a vacuum pumping device for supplying fluid under pressure to an actuation valve for operatively controlling a parking spring brake.

In FIG. 1 there is represented a dual full power braking system with the main system A being responsive to the split master cylinder 10 and the auxiliary system B being responsive to the inversion valve 12. Each system is operated independently of the other even though a common reservoir 14 in the master cylinder 10 is used to supply the same type of fluid to both systems.

In the main braking system A, in response to the application of a brake pedal (not shown) a piston (not shown) in the split master cylinder 10 will simultaneously transmit a pressure signal to the front power brake servomotor 16, of a type which operates in a manner fully described in U.S. Pat. No. 3,108,615 owned by the common assignee of the application and incorporated herein by reference, to operate the front service brakes 18 (only one of which is shown) and to the rear tandem power brake servomotor 20, which operates in the same manner as the front power brake servomotor 16, for operating the rear service brake 22, (only one of which is shown) in a manner fully described in copending U.S. application Ser. No. 797,530 incorporated herein by reference.

In the auxiliary braking system B used for parking brake, an inversion valve 12, of a type disclosed in copending U.S. application Ser. No. 28,843 incorporated by reference above, controls fluid pressure being supplied to a spring brake 24 operating in a manner fully described in U.S. application Ser. No. 797,530.

A vacuum pumping device 26, operatively connected by conduit 28 to inversion valve 12, will pressurize fluid received from reservoir 14. Through the vacuum pumping device 26, the fluid pressure acting on the spring brake 24 will be maintained within relatively constant range. A switch 30, of a type fully described in U.S. Pat. No. 3,593,265, owned by the same common assignee of this application and incorporated herein by reference, is located in conduit 28 adjacent the inversion valve 12. Switch 30 has an internal movable shaft (not shown) which is responsive to the fluid pressure in the conduit. If a low pressure is present in the conduit 28, this shaft will move to close an electrical contact switch which will cause an indicator device 32, either a warning light (as shown), which flashes or an audible signal (not shown), to be energized for alerting an operator of this low pressure condition.

Figure 2:
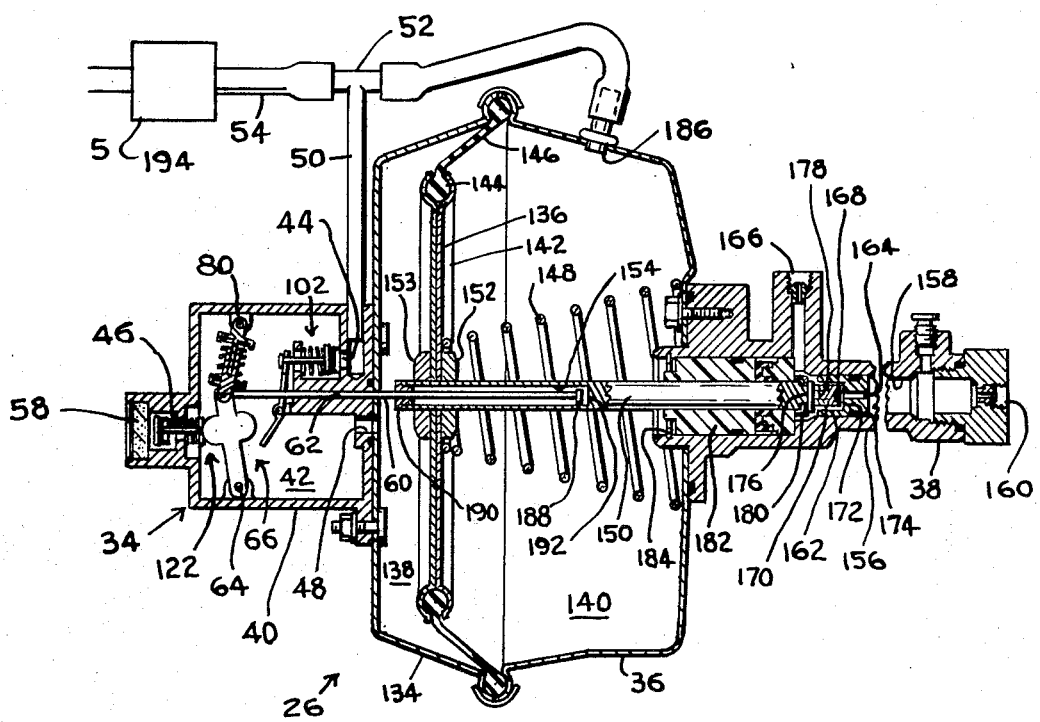
FIG. 2 is a sectional view of a vacuum pumping device with control means for positively regulating the flow of a first operational fluid of the braking system of FIG. 1.

The vacuum pumping device 26, shown in detail in FIG. 2 consists of a control means 34, a power transfer chamber 36 and a fluid intensifying chamber 38.

Figure 3:
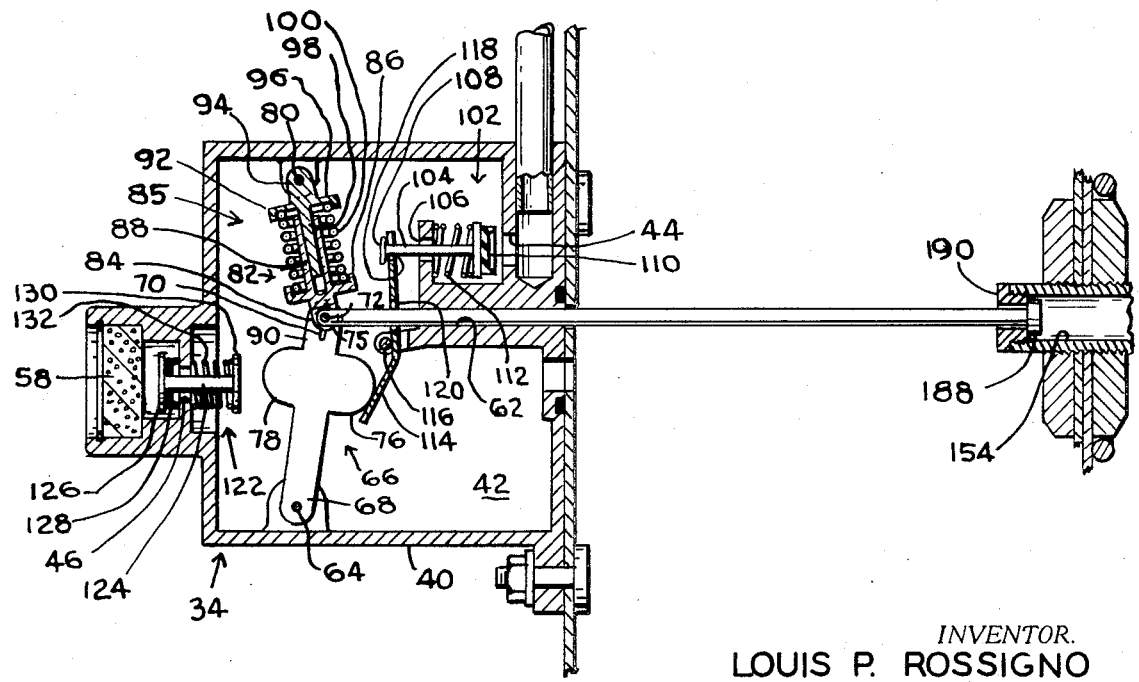
FIG. 3 is an enlarged sectional view of the control means of FIG. 2 for regulating the flow of a second operational fluid of the braking system of FIG. 1.

The control means 34 has a housing 40 having an internal chamber 42 with a first inlet port 44, a second inlet port 46 and an outlet port 48 into the power transfer chamber 36. The first inlet port 44 is connected by conduit 50 to a tee 52 in the partial vacuum supply conduit 54 going to the intake manifold 56 of the vehicle. The second inlet port 46 permits air at atmospheric pressure to pass through filter 58 and into the internal chamber 42. A push rod 60 extends through housing 40 and is carried by a bearing surface 62. The bearing surface 62 will maintain push rod 60 in axial alignment within the power transfer chamber 36. A first pivot pin 64 perpendicularly located with respect to the push rod 60 carries lever arm means 66. Lever arm means 66, as shown in FIG. 3, has one end 68 pivotally fixed to pin 64 and a slot 70 held by a retaining pin 72 in yoke 75 on the end of push rod 60. A first cam surface 76 is located along one side of the lever arm means 66 and a second cam surface 78 is located on the other side. A second pivot pin 80 is perpendicularly located with respect to the push rod 60 in a line directly opposite the first pivot pin 64. A first retaining means 82 has an eye 84 on one side of a disc 86 and a tubular projection 88 on the other side. The eye 84 is fixed, on the outside of the slotted end 90 of the lever arm means 66, to the yoke 75 by retaining pin 72. A second retaining means 92 has an eye 94 on one side of a disc 96 and a stem 98 on the other side for insertion into the tubular projection 88. The first and second retaining means 82 and 92 form a cage for holding resilient means 100 in compression upon securing eye 94 on the second pivot pin 80.

A first valve means 102 has a shaft 104 retained in a guide bearing 106 with a head 108 on one end and flexible disc shaped face 110 on the other end. A first spring 112 is located between the guide bearing 106 and the face 110 to urge the flexible disc shaped face 110 against the housing surrounding the first inlet port 44. A beam 114 is pivotally retained on pin 116 adjacent the first inlet port 44. Beam 114 has a yoke 118 on one end which surrounds shaft 104 adjacent head 108. A slot 120 permits beam 114 to surround push rod 60 and move on pivot pin 116 without affecting reciprocating motion of the push rod 60.

A second valve means 122 has a shaft 124 which is centrally located in the second inlet port 46. A disc 126 with a flexible portion 128 is secured to one end of the shaft 124 and a keeper 130 is secured to the other end. A spring 132 which surrounds shaft 124 is located between the portion of the housing around the second inlet port 46 and the keeper 130. The spring 132 biases the flexible portion 128 against the housing to seal the second inlet port 46 from communicating air at atmospheric pressure to the internal chamber 42.

The power transfer chamber 36 has a housing 134 with an internal cavity. The cavity is divided by a wall or diaphragm member 136 into a rear chamber 138 and a front chamber 140. The diaphragm member 136 has a stiff internal two-piece plate 142 which clamps together for holding a bead 144 of the flexible part 146 of the wall or diaphragm member 136. A resilient member 148 is concentrically located on plate 142 to surround a push rod 150 attached to the plate 142. A pair of nuts 152 and 153 are threaded on push rod 150 in a manner to hold plate 142 together. The push rod 150 has an internal bore 154 to which the control push rod 60 is attached. Push rod 114 will move the control push rod 60 which positions the cams on the lever arm means 66 against the first and second valves 102 and 122 during operation. The push rod 150 extends into the intensifying chamber 38 to transmit any force created across the diaphragm member 136 thereinto.

The fluid intensifying chamber 38 has a cylindrical body 156 with an axially extending chamber 158 from which fluid is forced through outlet 160 by a displacement piston 162 attached to push rod 150. To replace the loss of fluid in chamber 158 upon piston 162 moving (to the right as viewed in FIG. 2) to transmit pressurized fluid to the inversion valve 12, a compensating port 164 is connected to inlet port 166 in communication with reservoir 14. The change in volume of fluid in chamber 158 occurs because inversion valve 12 prevents the backflow of fluid from the spring brake 24 when engaged as the piston returns to the left, as viewed in FIG. 2. During power activation, the compensation port 166 is closed by a poppet member 168 retained in an enlarged section 170 of the port by seating on shoulder 172. The push rod 150 to which poppet member 168 is attached, projects into the enlarged section 170 and is loosely fastened to the piston 174 by cross pin 176. The cross pin 176 is fixed to the push rod 150 but moves in a slotted section 178 on the piston member 174. The length of the slotted section 178 is designed to permit the poppet member 168 to be unseated when the pin engages the rear end of the slot and seated on shoulder 172 at the front end of the slot. The cross pin 176 is prevented from coming loose by a snap ring 180 positioned in a groove, on the outer surface of the piston 174, overlying the ends of cross pin 176. A guide bearing 182, retained by a snap ring 184, maintains push rod 150 in alignment with the intensifying chamber 38 and prevents any fluid from entering into the front chamber 140.

MODE OF OPERATION OF THE PREFERRED EMBODIMENT

After turning on ignition switch 188 shown in FIG. 1, if low pressure exists in the conduit 28 and it is insufficient to release the spring brakes 24, a signal will be transmitted to indicator 32. This will alert the operator not to try to attempt to move the vehicle until the fluid pressure is raised to release the spring brakes 24.

When the engine of the vehicle is started, vacuum will be created at the manifold 56. This vacuum will be transmitted through conduit 54 to the vacuum pumping device 26 through inlet port 186 in housing 134 where chamber 140 will be evacuated. In the power position as shown in FIG. 2, inlet port 46 will be opened and air at atmospheric pressure will be communicated from the internal cavity 42 to the rear chamber 138. With vacuum in front chamber 140 and atmospheric pressure in rear chamber 138, a pressure differential will be created across wall diaphragm member 136. This pressure differential acting on wall or diaphragm member 136 will create a force which will move push rod 150, closing compensating port 164 and will pressurize the fluid in chamber 158 passing through outlet port 160. As the piston 174 approaches the bottom of the power stroke, cylindrical end 188 of push rod 60 will abut cap 190 and pull lever arm means 66 to the right past an imaginary base line formed by the first and second pivot pins 64 and 80, respectively. In moving past this imaginary line, resilient member 100 will be compressed as stem 98 moves in tubular section 88 of the caging means 85. The resilient member 100 will pull push rod 60 momentarily after passing the imaginary line as resilient means 100 expands to move the first and second retainer 82 and 92 away from each other. The resilient means 100 will create a force which will act on the connecting pin 72 causing the lever arm means 66 to pivot on pin 64. When the lever arm means 66 pivots to the right from a first position as viewed in FIG. 2 to a second position as viewed in FIG. 3, the first cam surface 76 will engage beam 114 causing beam 114 to correspondingly pivot on pin 116. As beam 114 pivots on pin 116, yoke 118 will be moved against head 108 to slide shaft 104 in bearing 106 and unseat flexible member 110 from the first inlet port 44. With the first inlet port opened, partial vacuum from the intake manifold will evacuate air from the rear chamber 138. At the same time, spring means 132 will positively seal resilient head 128 on the housing 40 surrounding the second inlet port 46 to prevent air at atmospheric pressure from entering the internal chamber 42. As the partial vacuum evacuates the rear chamber 138, resilient means 148 will move diaphragm 136 to the left bringing piston 174 to the top of the stroke in the fluid intensifying chamber 38. As diaphragm 136 moves to the left, cylindrical end 188 on the control rod 60 will slide in bore 154 since resilient means 100 is strong enough to hold the first cam surface 76 stationary against beam 114. The cylindrical end 188 will slide in bore 154 until reaching bottom 192. Further leftward movement by resilient means 148 will be transmitted to control rod 60. Movement of control rod 60 to the left past the imaginary base line between the first and second pivot points 64 and 80 will cause disengagement of the first cam surface 76. With cam surface 76 out of contact with beam 114, the first valve 102 will immediately close. Simultaneously, upon the second cam surface 78 engaging keeper 130 the second valve means 122 will begin to open. Resilient means 100 will supply the force to move lever arm means 66 to open the second inlet port 46 and permit air at atmospheric pressure free access to the rear chamber. The above cycle is repeated until the fluid pressure in the hydraulic fluid in conduit 28 retained in accumulator 31 by check valve 29 is equal to the force created by the pressure differential across the diaphragm 146.

With the inversion valve 12 in the closed position C, shown in FIG. 1, pressurized hydraulic fluid will hold spring brakes 24 released. Once the pressurized differential across the diaphragm 146 is established check valve 194 will prevent fluctuation in the partial vacuum level in the front chamber 140. However, the diaphragm 136 will correspondingly permit piston 174 to move in cylinder 138 due to thermal expansion of the hydraulic fluid to prevent rupturing the supply conduit 28.

In the embodiment of the control means 200, shown in FIG. 4, and 300 shown in FIG. 6, similar parts as used in FIGS. 2 and 3 are designated with the same numeral. The lever arm means 202 is constructed of an L-shaped member 204 having a first cam surface 206 with an arcuate shape located in a cut out portion in one leg 208 and a second cam surface 210 located in the other leg 213. A yoke 214 on the end of shaft 104 of the first valve means 102 which surrounds leg 208 has a roller pin 216 which engages the first cam surface 206 to control opening and closing of the first inlet port 44. A slot 212 permits the lever arm means 204 to be joined to the control rod 60 where the caged resilient means 100 can position the opposite cam surface against the first and second valve to supply the energizing fluid to the power transfer chamber 36.

The control means 300 shown in FIG. 6, consists of a housing 302 having a first inlet port 30, see FIG. 7, connected to a source of partial vacuum, a second inlet port 306 connected to air at atmospheric pressure and an outlet port 308 connected to the rear chamber 138 of the power transfer means 136. The caging means 85 for resilient member 100 is perpendicularly located with respect to control push rod 60 and guide surface 308. A force transmitting push rod 310 having a forked end 312 with a slot 314 is connected to the control push rod 60 by connecting pin 72. The force transmitting push rod 310 is connected to a center hole 317 of a snap action spring 316, see FIG. 8, by rivet 318. The snap action spring 316 has a plurality of ears 320 and 322 which are retained in slots 322 and 326 on a stationary support 328 and a pivotal support 330, respectively. The pivotal support 330 is retained on pin 332 fixed to the housing 302. A pair of springs 334 and 336 are connected to pins 338 to hold the ears 320 and 322 in the slots 324 and 326.

A first control valve 338 has a shaft 344 with a head 340 retained in a first external hole 342 on the snap action spring 316. A disc 346 with a flexible face 348 is attached to the end of shaft 344. The length of shaft 344 is selected to permit the snap action spring 316 and the caged spring 85 to urge the flexible face against the portion of the housing 302 surrounding the first inlet port 304 to prevent communication of partial vacuum to the interior cavity 350 of the housing 302.

A second control means 352 has a shaft 354 with a head 356 secured to a second external hole 358 in the snap action spring 316. A disc 360 with a flexible face 362 is attached to the end of shaft 354. The length of shaft 354 is selected to allow the flexible face 362 to be seated on the portion of the housing 302 surrounding the second inlet port 306 when the snap action spring 316 changes from a first position curve shown in FIG. 6 to a second symmetrical position curve about an imaginary line running from slot 324 to slot 326.

In the position shown in FIGS. 6 and 7, air at atmospheric passes through the filter 364 past the second inlet port 306 into cavity 350 and out the outlet port 308 to the rear chamber 138. With air at atmospheric pressure in the rear chamber 138 and partial vacuum in front chamber 140, a pressure differential is created across diaphragm member 136. This pressure differential will cause the push rod 150 to move. As the push rod 150 approaches the bottom of its stroke, cylindrical end 188 will engage end cap 190 and move the connecting pin 72 attached to eye 84 in slot 314. By the time the connecting pin 72 and eye 84 of the caged resilient means 85 have reached the bottom of slot 314 they will have passed the perpendicular point between pivot pin 80 and surface 308. Thus, resilient means 100 slide push rod 60 in bore 154 pulling the force transmitting rod 310 causing snap spring 316 to momentarily flatten as it passes through the imaginary line going through the retaining slots and spring into a symmetrical arch on the opposite side to close the communication through the second inlet port 306 and open the first inlet port 304. With inlet port 304 opened, the partial vacuum will evacuate the air from the rear chamber 138 and cavity 350 to eliminate the pressure differential across the diaphragm member 136.

In the absence of a pressure differential, resilient means 148 will move the push rod 150 and piston 174 toward the rear chamber 138. As the push rod 150 moves toward the rear chamber 138, the cylindrical end 188 will contact the bottom 192 of the bore 154 causing the connecting pin 72 to slide in slot 314. By the time pin 72 has reached the bottom of the slot the caged resilient means 85 will have passed the perpendicular point.

Upon crossing the perpendicular point, the resilient means 100 will move push rod 60 in bore 154 causing force transmitting push rod 310 to move the snap spring 316 to momentarily flatten and flex into a symmetrical position curve about an imaginary line through slots 324 and 326. In this position the partial vacuum communication through the first inlet port 304 is closed and air at atmospheric pressure permitted to enter to cavity 350 through the second inlet port. The above cycle is repeated until the fluid pressure in conduit 28 is equal to the force created by the pressure differential across the diaphragm 100.

Through the above described control means 34 and 200 and 300 with the independent operated positive first and second valves 102 and 122, the flow of partial vacuum and air at atmospheric pressure will be regulated in a manner to prevent mixing. Thus, the full force created by the partial differential can be controlled and utilized each time the diaphragm member 136 in the power transfer chamber 36 is stroked.

I claim:

1. In a power braking system, control means for positively regulating the alternate communication of vacuum and air at atmospheric pressure to a movable wall to operate a pump supplying pressurized fluid through a conduit to a manually actuated valve connected to a spring parking brake, said control means comprising:
   a housing having an internal chamber with a first inlet port connected to a source of vacuum, a second inlet port connected to air at atmospheric pressure, and a communication port connected to said movable wall;
   a push rod member connected to said movable wall and extending through said housing into said internal chamber;
   first pivot pin means secured to said housing perpendicular to said push rod member;
   caging means having one end fixed to said pivot pin means and the other end fixed to a connecting pin on said push rod for retaining a first resilient member;
   actuation means retained in said housing having an end with a slot therein, said slot surrounding said connecting pin;
   first valve means adapted to be biased against said first inlet port through said actuation means by said caging means for controlling the communication of said source of vacuum to said internal chamber; and
   second valve means adapted to be alternately biased with said first valve means against said second inlet port through said actuation means by said caging means for controlling the communication of said air at atmospheric pressure to said internal chamber, said actuation means engaging said first valve means in response to said resilient member expanding and moving to permit vacuum communication with said internal chamber only during a first directional position of said movable wall and engaging said second valve means in response to said resilient member expanding and moving said actuation means to allow air at atmospheric pressure communication with said internal chamber only during a second directional position of said movable wall, said first and second directional position being diametrically opposed to permit an operational pressure differential to be created across said wall means.

2. The power braking system, as recited in claim 1 wherein said actuation means includes:
   second pivot pin means secured to said housing perpendicular to said push rod member directly opposite said first pivot pin means; and
   lever arm means having one end fixed to said second pivot pin means and the other end having said slot therein secured by said connecting pin to said push rod member, said lever arm means having a first cam surface and a second cam surface for operatively engaging said first and second valve means.

3. The power braking system, as recited in claim 2 wherein said caging means includes:
   a first retainer member having an annular portion with an eye on one side and a tubular section on the other side, said eye being fixed to said retaining pin on said push rod member; and a second retainer member having an annular portion with an eye on one side and a stem on the other side, said eye of the second retainer member being fixed to said second pivot pin and said stem being retained in said tubular section, said first resilient means being held between said first and second retainer members, said stem moving in said tubular member to permit said first resilient means to collapse and allow said connecting pin on said push rod to correspondingly move past an in line position point with said first and second pivot pins to initiate the first and second directional position change in said movable wall, said first and second cam surfaces momentarily maintaining their respective engagements with the first and second valve means until said connecting pin has passed said in-line position point to reduce the possibility of both the first and second valve means being closed by a stall condition in said wall means.

4. The power brake system, as recited in claim 3 wherein said first valve means includes:
   a first shaft retained in a guide surface in said housing;
   a first flexible face member attached to said first shaft; and
   first spring means surrounding said first shaft for urging said flexible face into a seating position on the housing surrounding said first inlet port to preclude communication of vacuum through said first inlet port during said second direction position of said wall means, said first cam surface acting on said first shaft in response to expansion of said first resilient means to overcome said first spring means and unseat said flexible face from around said first inlet port to permit communication of vacuum through said first inlet port.

5. The power braking system, as recited in claim 4 wherein said second valve means includes:
   a second shaft centrally located in the second inlet port of said housing;
   a second flexible face member attached to one end of said second shaft and located on the atmospheric side of said second inlet port, said face member being larger in diameter than said second inlet port;
   a keeper member located on the other end of said second shaft; and
   second spring means surrounding said second shaft and located between the portion of the housing surrounding said second inlet port and said keeper member, said spring means urging said second flexible face member into a seating position on the housing surrounding said second inlet port during said first directional position of said wall means to preclude communication of air at atmospheric pressure into said internal chamber, said second cam surface acting on said keeper member to overcome said second spring means and allow air at atmospheric pressure into said chamber during said second directional position of the wall means.

6. The power braking system as recited in claim 5 wherein said first valve means further includes:
   a yoke located on the end of said first shaft, said yoke surrounding a portion of said lever arm means adjacent said first cam surface; and
   a roller pin located in the yoke for engaging said first cam surface during said first directional position of said wall means.

7. The power braking system as recited in claim 5 wherein said first valve means further includes:
   a head located on the end of the said first shaft;
   a beam member having a slot wherein said push rod member is located, said beam member being pivotally located on said housing adjacent said first inlet port; and
   a fork located on the end of said beam member, said fork surrounding said first shaft and engaging said head when said first cam surface acts on said beam to unseat said first flexible face member during the second directional position of said wall means.

8. The power braking system, as recited in claim 6 further including:
   means located in said conduit for transmitting a signal to an indicator device to alert an operator of the fluid pressure transmitted to said actuation valve.

9. The power braking system, as recited in claim 8 further including:
   means located between the source of vacuum and the pump for preventing fluctuation in the pressure level of the vacuum.

10. The power braking system, as recited in claim 1 wherein said actuation means includes:
   a power transmission shaft having said slot located in one end thereof; and
   spring means located on the other end of said power transmission shaft and connected to said first and second valve means for alternately opening and closing the first and second inlet ports, respectively, to create the first and second directional position changes in the movable wall, said spring means and said caging means cooperating to move the power transfer means in a manner to assure only one of said first and second valve means is opened and closed at the same time.

* * * * *